US012002357B2

(12) United States Patent
Clifford et al.

(10) Patent No.: US 12,002,357 B2
(45) Date of Patent: Jun. 4, 2024

(54) DATA CONSUMABLE FOR INTELLIGENT TRANSPORT SYSTEM

(71) Applicant: Cavnue Technology, LLC, Arlington, VA (US)

(72) Inventors: David Hahn Clifford, Royal Oak, MI (US); Demetrios Vasili Kellari, Brooklyn, NY (US)

(73) Assignee: Cavnue Technology, LLC, Arlington, VA (US)

( * ) Notice: Subject to any disclaimer, the term of this patent is extended or adjusted under 35 U.S.C. 154(b) by 269 days.

(21) Appl. No.: 17/573,088

(22) Filed: Jan. 11, 2022

(65) Prior Publication Data

US 2023/0222907 A1  Jul. 13, 2023

(51) Int. Cl.
*G08G 1/0967* (2006.01)
*B60W 30/14* (2006.01)
(Continued)

(52) U.S. Cl.
CPC ..... *G08G 1/096716* (2013.01); *B60W 30/143* (2013.01); *B60W 30/18163* (2013.01);
(Continued)

(58) Field of Classification Search
CPC ........... G08G 1/0967; G08G 1/096716; G08G 1/0116; G08G 1/091; G06V 20/54;
(Continued)

(56) References Cited

U.S. PATENT DOCUMENTS 10,403,150 B1 * 9/2019 Nepomuceno ......... G08G 1/205
10,991,242 B2 * 4/2021 Taylor ...................... H04Q 9/00
(Continued)

FOREIGN PATENT DOCUMENTS

CA  3068251 C  *  3/2023  .............. G01S 17/10
GB  2602391 A  *  6/2022  .............. E01F 9/615
(Continued)

OTHER PUBLICATIONS

International Search Report and Written Opinion in International Appln. No. PCT/US2022/050718, dated Mar. 6, 2023, 18 pages.
(Continued)

*Primary Examiner* — Atul Trivedi
(74) *Attorney, Agent, or Firm* — Fish & Richardson P.C.

(57) ABSTRACT

Systems and techniques are described for consuming data in an intelligent transport system. In some implementations, a system includes a display screen device and sensors. The sensors generates data describing sensor observations of a roadway at a first location and provides data describing the observations to the display screen device. The display screen device receives the data and determines an event and a type of the event. The display screen device displays second data indicative of the type of event, the second data being of a format that is consumable by a sensor on a vehicle traversing the roadway towards the first location, the sensor (i) located within a first resolution distance from the display screen device and (ii) located outside a second resolution distance of detecting the event, wherein the second data is used by an on-board processing system of the vehicle to adjust its driving behavior.

20 Claims, 4 Drawing Sheets

(51) Int. Cl.
*B60W 30/18* (2012.01)
*G06F 3/14* (2006.01)
*G06K 7/10* (2006.01)
*G06K 7/14* (2006.01)
*G06V 20/54* (2022.01)
*G06V 20/58* (2022.01)
*G08G 1/01* (2006.01)
*G08G 1/09* (2006.01)

(52) U.S. Cl.
CPC ....... *G06F 3/1423* (2013.01); *G06K 7/10722* (2013.01); *G06K 7/1417* (2013.01); *G06V 20/54* (2022.01); *G06V 20/582* (2022.01); *G08G 1/0116* (2013.01); *G08G 1/091* (2013.01); *B60W 2420/40* (2013.01); *B60W 2420/403* (2013.01); *B60W 2420/408* (2024.01); *B60W 2556/45* (2020.02); *B60W 2720/10* (2013.01)

(58) Field of Classification Search
CPC .............. G06V 20/582; B60W 30/143; B60W 30/18163; B60W 2556/45; B60W 2420/40; B60W 2420/42; B60W 2420/52; B60W 2720/10; G06F 3/1423; G06K 7/10722; G06K 7/1417
USPC .......................................................... 701/26
See application file for complete search history.

(56) References Cited

U.S. PATENT DOCUMENTS

| | | | |
|---|---|---|---|
| 2004/0145496 A1* | 7/2004 | Ellis | G09B 21/006 340/905 |
| 2014/0195068 A1 | 7/2014 | Boss et al. | |
| 2019/0132709 A1 | 5/2019 | Graefe et al. | |
| 2019/0236382 A1 | 8/2019 | Hall et al. | |
| 2021/0049901 A1* | 2/2021 | Young | H04W 4/46 |
| 2021/0157330 A1* | 5/2021 | Tran | G06V 20/588 |
| 2021/0318691 A1 | 10/2021 | Amini et al. | |
| 2022/0135061 A1* | 5/2022 | Seitz | B60K 35/28 701/26 |
| 2022/0208007 A1* | 6/2022 | Arora | G06T 7/20 |
| 2022/0222587 A1* | 7/2022 | Li | G08G 1/096844 |
| 2022/0252424 A1* | 8/2022 | Zhang | G06V 20/582 |
| 2022/0284627 A1* | 9/2022 | Johnson | B60W 30/143 |
| 2022/0327183 A1* | 10/2022 | Russo | A63F 13/25 |
| 2023/0039738 A1* | 2/2023 | Beaurepaire | G08G 1/0129 |
| 2023/0182747 A1* | 6/2023 | Kobayashi | G16Y 40/10 701/1 |
| 2023/0186870 A1* | 6/2023 | Cristache | H04W 12/68 345/204 |
| 2023/0266756 A1* | 8/2023 | Wengreen | G05D 1/0088 701/23 |
| 2023/0271556 A1* | 8/2023 | Kobashi | G01S 17/89 348/142 |

FOREIGN PATENT DOCUMENTS

| | | | | |
|---|---|---|---|---|
| KR | 102515036 B1 * | 3/2023 | ............. | G08G 1/091 |
| WO | WO-2022080146 A1 * | 4/2022 | ............. | B60K 35/00 |

OTHER PUBLICATIONS

Hu et al, "A multirange vehicle speed prediction with application to model predictive control-based integrated power and thermal management of connected hybrid electric vehicles" ASME, 2022, 11 pages.

* cited by examiner

DATA CONSUMABLE FOR INTELLIGENT TRANSPORT SYSTEM

BACKGROUND

Vehicles can travel on roadways, highways, and backroads to their destination. In many cases, a vehicle can travel along a road with other vehicles and is positioned behind the other vehicles, next to another vehicle, or in front of another vehicle during its journey. Additionally, vehicles often move positions on the roadway by accelerating, decelerating, or changing lanes. Given the number of vehicles in any given section of road, and the changing speed and positions of the vehicles, collecting and maintaining vehicle speed and position data, and other vehicle data, is a complex and processing intensive task.

SUMMARY

The subject matter of this application describes an intelligent transport system that enables on-board vehicular sensors to consume environment and/or control data either visually or with near field detection and communicate with an on-board processing system that is configured to take action based on the consumed data while traversing a roadway. In particular, the intelligent transport system enables sensors located proximate to a roadway to generate sensor data regarding events occurring on a roadway. These sensors can detect the event and communicate data of the detected event to a display screen system and other external systems. The intelligent transport system can also include a display screen system that is located proximate to the roadway and can display messages for the vehicles' information. The display screen system can include one or more display screen devices and an external server. In particular, the display screen system can receive the data indicative of the detected event from the sensors, determine the type of the event, and display this information to the vehicles traveling on the roadway. The vehicles can monitor a display screen of the display screen device as they traverse the roadway to learn of upcoming events on the roadway that they cannot currently detect by the vehicles' on-board sensor system. These events may be too far ahead for the vehicles on-board sensor system to detect. In some cases, the intelligent transport system may include multiple display screen devices spaced predetermined distances apart along the roadway. By including multiple display screen devices that display the same sensor detected information, the likelihood the vehicles obtain the information and take action to safeguard against these events greatly increases.

More specifically, the technologies described in this applicable enable vehicles to receive notification of events not currently detected by the vehicle's on-board sensor systems. The intelligent transport system can detect through its sensors located proximate to the roadway upcoming or on the horizon events and relay information describing these events to vehicles that have not yet driven past the location of such events via the display screen. For example, the sensors on the roadway may detect ice on a roadway at a first location. The sensors can transmit the sensor data indicative of ice on the road to the one or more display screen devices.

The one or more display screen devices can (i) determine from the detected sensor data of the type of the detected event and (ii) display to vehicles traversing the roadway that the roadway ahead is icy. The one or more display screen devices can also control how the data is displayed and what data is displayed. Specifically, each display screen device of each display screen device can include an array of indicators of uniform size, the indicators displaying information determined from the detected sensor data. The indicators can be intentionally machine readable and highly visible. For example, each indicator can be a QR code or some other design form to display information readable to vehicles' that pass by the display screen devices.

In some implementations, each display screen device can control the manner in which the data is displayed. For example, the display screen device may control a size, a refresh rate, a glare control amount, and other characteristics of the display in response to detecting extrinsic conditions. The display screen device can also rank information to be displayed based on a type of event detected from the sensors. Ranking information enables vehicles to obtain important information about upcoming road events in an ordered manner. Additionally, the display screen device can control a size and the periodicity of notifications to display to (i) ensure visibility from long distances and (ii) ensure visibility of notifications proportional to underlying roadway speeds.

The vehicles' on-board sensors can obtain data from the one or more display screens and take action to avoid the icy roadway, such as finding an alternative route and driving the alternative route, in this particular example. Other examples are also possible, as will be described below.

The vehicles' on-board sensor system can obtain or capture the data from the display screen in a variety of manners. For example, the display screen device may display data indicative of the detected event through a QR code, textual data, video, or in the form of one or more images, or a combination of the above. The on-board sensor system of each vehicle can capture this information through a visual manner or a near field detection manner and provide the captured data to an object detection module. The object detection module, which may include one or more trained machine learning algorithms and other sensor fusion algorithms, can (i) generate observations about the detected data from the display screen and can (ii) generate actions for the vehicles to take based on the detected data from the display screen.

The vehicles can take actions that ensure the vehicles avoid the roadway where the event has occurred. For example, the on-board sensors can ensure the vehicles navigational system generates a different route that avoids the location on the roadway where the event occurred. In another example, the on-board sensors can adjust the speed of a vehicle in the case that driving the event at a high speed causes unsafe driving. In another example, the on-board sensor system can adjust or modify a vehicles lateral or longitudinal control policy. In this example, the vehicle's on-board sensor system can receive a warning of ice on the road and the on-board sensors can decide to decelerate, change a steering angle to retain a safe path down the roadway, and ensure the safe path does not include the location of ice on the road.

In some examples, the on-board sensor system can adjust, based on data identified from the display screen, a manner in which the on-board sensor system weights perceived objects in the environment. For example, a vehicle that is warned of a dust storm, fog ahead, or another severe weather type might add additional antenna gain or antenna weights to Radar inputs in the object detection module. In this case, the on-board sensor system may set a higher preference for Radar inputs or may adjust exposure of a camera, such as by switching to low light to improve the camera's visibility. Other examples are also possible.

In some examples, the on-board sensor system may adjust a manner in which its vehicle reacts to other vehicles on the roadway. For example, the on-board sensor system may adjust the vehicle's driving strategy to become more conservative or more aggressive, based on a type of the event detected. If the event detected is an erratic driver, then the on-board sensor system of vehicles may adjust the driving mode to be more cautious to decrease the likelihood of an accident. If the event detected was an increase speed due to a traffic sign, then the on-board sensor system of vehicles may adjust the driving mode to be more aggressive to increase the speed of the vehicle when the vehicle crosses the event.

In some implementations, the intelligent transport system can include sensors placed in a longitudinal manner along the roadway for monitoring the movement of vehicles, the vehicles' position, their movement amongst other vehicles, and events detected on the roadway. These sensors can communicate with one another, communicate with a central server, and communicate with a display screen device positioned along the roadway. For example, the sensors can be placed along the roadway for acquiring sensor data regarding an event indicative of animals currently crossing the roadway at a particular location. Other examples are also possible.

In some implementations, each vehicle can include a telematics system for communicating with external components within the intelligent transport system. The telematics system can be enabled for communication in an on state or in response to on-board sensors of the vehicles detecting an event from the display screen that requires the vehicles communication. For example, if the on-board sensor system determines that the display screen displays information that describes an upcoming gas station ahead, the on-board sensor system can enable the telematics system, so that the vehicle's telematics system can relay an amount of gas available to an external component, such as a fleet management system. The fleet management system can determine whether the vehicle should stop to get gas based on the amount of gas available in the vehicle, and transmit a notification to the on-board sensor system of the vehicle based on the determination. Other examples are also possible.

In one general aspect, a method is performed by a system. The method includes: receiving, from a first set of sensors and at a display screen device, data describing sensor observations by the first set of sensors on a roadway at a first location, wherein the first set of sensors are positioned in respectively fixed locations relative to the roadway and the display screen device is (i) positioned in a fixed location relative to the roadway and (ii) at an orientation relative to the roadways so that the display screen device is viewable from the roadway; determining, by the display screen device, a detected event and a type of the detected event on the roadway from the data describing the detected observations on the roadway; and displaying, by the display screen device, second data indicative of the determined type of event, the second data being of a format that is consumable by a second sensor on a vehicle traversing the roadway towards the first location, the second sensor (i) located within a first resolution distance from the display screen device and (ii) located outside a second resolution distance of detecting the event at the first location, wherein the second data is used by an on-board processing system of the vehicle Other embodiments of this and other aspects of the disclosure include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The foregoing and other embodiments can each optionally include one or more of the following features, alone or in combination. For example, one embodiment includes all the following features in combination.

In some implementations, the method includes detecting an abnormal event on the roadway at the first location using the detected observations, the abnormal event indicative of an event for the vehicle to avoid when traversing the roadway; and transmitting data indicative of the detected abnormal event on the roadway to (i) the other sensors of the first set of sensors and (ii) a central server.

In some implementations, the method includes generating, by the display screen device, the second data indicative of the determined type of the event, wherein the second data indicative of the determined type of event comprises at least one of a QR code, a textual message, a video, and one or more images.

In some implementations, the method further includes a plurality of display screen devices positioned in respectively fixed locations relative to the roadway and at the orientation relative to the roadway so that each of the plurality of display screen devices are viewable from the roadway, wherein each display screen device of the plurality of display screen devices is positioned at a predetermined distance apart from each other display screen devices.

In some implementations, the method includes wherein the first set of sensors comprises at least one of LIDAR, Radar, video cameras, and infrared cameras.

In some implementations, the method includes wherein the determined type of the event detected on the roadway comprises at least one of a driving hazard, a weather condition, erratic driving behavior of another vehicle, and a gas station.

In another aspect, a vehicle system includes: a first set of sensors for mounting on a vehicle, the sensors operable to detect display data indicative of a type of event determined and displayed on a display screen of a display screen device positioned at a fixed location relative to a roadway, the event occurring on the roadway at a first location; an on-board processing system for mounting on the vehicle to be in communication with the first set of sensors, and being operable to: receive and process the detected display data indicative of the type of event from the display screen; and adjust a driving behavior of the vehicle based on the processed data to avoid the event detected on the roadway at the first location.

In some implementations, wherein the on-board processing system is further configured to: in response to processing the detected display data, modify a lane traversal control policy, wherein the lane traversal control policy indicates a portion of a lane for the vehicle to traverse on the roadway, the portion of the lane comprising (i) a center of the lane, (ii) a left side of the lane, and (iii) a right side of the lane; or in response to processing the detected display data, modify a current speed of the vehicle.

In some implementations, wherein the on-board processing system is further configured to: provide the detected display data to an object detection model, the object detection model is configured to (i) receive data inputs from each of the first set of sensors and (ii) generate an indication of an object, wherein the first set of sensors comprises a LIDAR system, a radar system, a video camera, and a network connectivity system.

In some implementations, wherein the on-board processing system is further configured to: in response to processing the detected display data, adjust weights associated with the object detection model to improve subsequent detection of objects based on the determined type of event, wherein the weights preference inputs from the first set of sensors for the object detection model in generating a detection of an object.

In some implementations, wherein the on-board processing system is further configured to: in response to processing the detected display data, adjust a driving strategy of the vehicle based on the determined type of event, wherein the driving strategy comprises a conservative mode or an aggressive mode.

In some implementations, wherein the on-board processing system is further configured to: in response to processing the detected display data, engage a telematics system to communicate with a central server and external databases; and transmit communications to the central server and the external databases, the communications indicating actions taken by the on-board processing system for adjusting a driving mode of the vehicle corresponding to the first set of sensors.

In some implementations, wherein the first set of sensors are further configured to: detect a set of features as the vehicle traverses the roadway, wherein the set of features comprises environmental conditions, roadway conditions, other vehicles and does not include features indicative of the event detected at the first location.

In some implementations, wherein the first set of sensors are further configured to: capture imagery of a QR code from the display screen; capture textual message from the display screen and perform optical character recognition on the textual message; capture video from the display screen; or capture one or more images from the display screen.

The systems and methods described above may realize one or more of the following advantages. By generating visual data that can be detected by on-board automobile sensors, the system can provide a level of real-time intelligence to the automobile without requiring access to the on-board system of the automobile. This results in a higher level of security while providing real time traffic data that can be realized by establishing communication links to each automobile. Moreover, because the data can be encoded to generate visual data, the encoding scheme can be published to each automobile manufacturer, and each automobile manufacture can then program their respective systems according to their own proprietary practices and systems. This allows the entity that provisions the alert data to not have to create different communication protocols for each automobile manufacturer, which reduces design costs.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
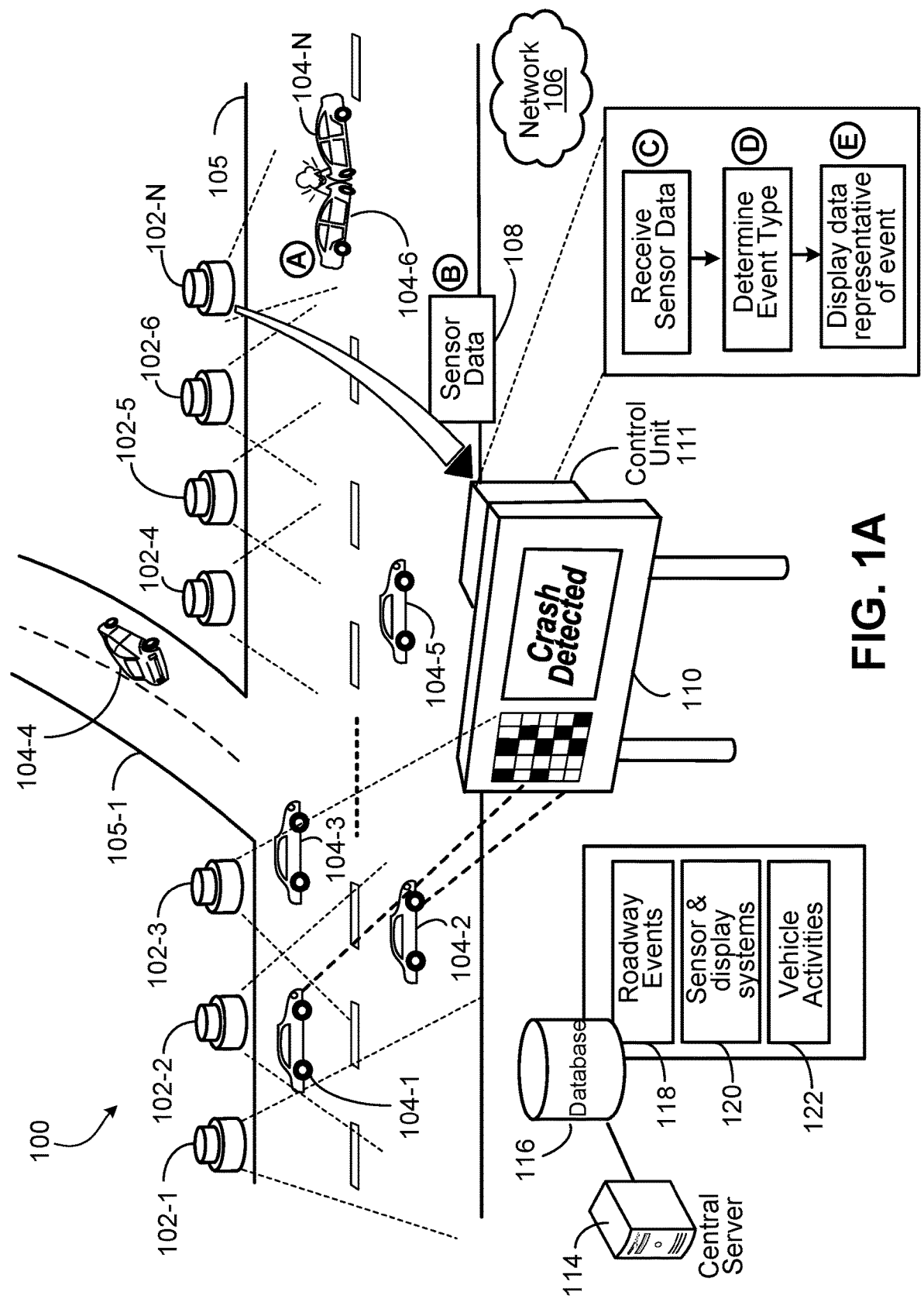
FIGS. 1A-1B are block diagrams that illustrate an example of systems that consume and process data in an intelligent transport system.

FIG. 1A is a block diagram that illustrates an example of system 100 that consumes and processes data in an intelligent transport system. The system 100, deployed upon a road 105 on which vehicles 104-1 through 104-N (collectively "vehicles 104") travel, includes a plurality of sensors 102-1 through 102-N (collectively "sensors 102"), a display screen device 110, a network 106, a central server 114, and a database 116. The system 100 illustrates seven sensors and six vehicles, although the system 100 may include more or less sensors and more or less vehicles in other configurations. Additionally, the road 105 includes multiple lanes in a particular direction, and another lane 105-1 that diverges from the road 105. Alternatively, the road 105 may include a greater number of lanes having vehicles traveling in opposing directions and vehicles traveling in the same direction. FIG. 1A illustrates various operations in stages (A) through (E), which can be performed in the sequence indicated or another sequence.

The display screen device 110 includes a control unit that performs the intelligence of system 100. In particular, the display screen device 110 can receives sensor events from the sensors and the control unit of the display screen device 110 can detect an event on the road 105 from the sensor data. The control unit can then generate data of the detected event to be displayed by the display screen device 110 on a display screen. The display screen can be, for example, one or more LED screens, a plasma screen, or another type of display screen. The data of the detected event can be an encoded form of the detected event, video data, image data, textual data, or a combination of the data. Vehicles can include on-board sensor systems that can capture the data of the detected event displayed by the display screen device 110 on the display screen and can decode and/or process the captured data to interpret a context or meaning of the captured data. In response, the vehicle's on-board sensor system can adjust a driving behavior of the vehicle based on the interpreted context or meaning of the captured data. The system 100 further includes a central server 114 that can store data generated, captured, and processed by system 100. By storing data utilized by system 100 at the central server 114, the system 100 can be monitored for efficiency and for improvements.

In general, the system 100 can enable on-board vehicular sensors to ingest environment and/or control data. In particular, the on-board vehicular sensors can consume the environment and/or control data visually or with near field detection and communicate with the vehicle's on-board processing system. The environment data can include data surrounding the vehicle such as, for example, the environment, neighboring vehicles, and other objects surrounding the vehicle. Control data can include data received from external components such as, for example, the central server 114 and the display screen device 110. In response, the vehicle's on-board processing system is configured to take action based on the consumed data while traversing a roadway.

The system 100 can include a display screen device 110 that communicates with external sensors that generate sensor data regarding events occurring on the road 105. The display screen device 110 can be located proximate to the road 105 and can display messages for the vehicles' information. Specifically, the sensors 102 can generate sensor data of events detected on the road 105 and transmit the generated sensor data to the display screen device 110. The display screen device 110 can receive the data indicative of the detected event from the sensors 102, determine the type of the event from the received data, and display the event type to the vehicles 104 traversing the road 105.

As will be explained in more detail below, the vehicles 104 can traverse the road 105 and can monitor the display screen device 110 to detect of upcoming events that they cannot currently detect by their on-board vehicular sensors. These events may be too far ahead for the vehicles on-board sensor system to detect. In other implementations, the vehicles can traverse the road 105 and can detect events on the roadway as they come into field-of-view of the on-board vehicular sensors.

The sensors 102 situated along the road 105, e.g., sensors 102-1 through 102-N, can acquire sensor data regarding particular events on the road 105, e.g., vehicle moving on the road in a particular direction or a vehicular car accident. The system 100 can generate and monitor sensor data that not only describes the vehicle or the event but can also describe a location of the object within a lane of the road 105, a speed of that vehicle, a speed headway of the vehicle, and the relationship of that vehicle to other vehicles on a per frame basis. Moreover, the system can generate and monitor sensor data in a similar manner for multiple events as well as, multiple events detected on the roadway. As used herein, an "event" in the context of the roadway includes traffic conditions (slow traffic, jams, etc.), obstacles on the road (stalled vehicles, debris, water, ice, etc.), emergency vehicles (ambulances, firetrucks, police cruises operating in a manner that requires traffic to yield), or any other condition or obstacle that the sensors and system can detect and identify and that may require a change a driving behavior of the vehicle.

Examples of objects or road actors found in system 100 can include, for example, a vehicle, such as a car, a semi-truck, a motorcyclist, and even a bicyclist. The system 100 can also identify a person that is moving along the road 105, such as along the sidewalk adjacent to the road or crossing the street. The system can also identify other objects on the road 105, such as an animal or an obstruction that may impede the flow of traffic. For example, these obstructions may include car accidents, oil leaks, a tree laying on the road, a fallen transmission line, ice on the road 105, and other hazardous conditions.

The sensors 102 can include a variety of software and hardware devices that monitor objects on road 105. For example, the sensors 102 can include a LIDAR system, a video camera, a radar system, a Bluetooth system, and a Wi-Fi system to name a few examples. A sensor can include a combination of varying sensor types. For example, sensor 102-1 can include a video camera, a radar system, and a motion detection system; sensor 102-2 can include a video camera and a radar system; and, sensor 102-N can include a video camera, a LIDAR system, and a Wi-Fi system. Alternatively, a sensor may just include a single component, such as a LIDAR system. Additionally, other sensor combinations are possible.

In some implementations, the sensors can have some detection capability in addition to generating sensor data of observations. The detection capability can include identifying emergency vehicles, identifying vehicular events, identifying ice or water conditions on roadways, identifying erratic driving behavior, and other identifying features. In other implementations, the sensors can generate sensor data and provide the sensor data to the display screen device 110, where the display screen device 110 performs the detection capabilities on the sensor data. For example, if the sensors are capable to determine events from their own observations, then the sensors can (i) generate sensor observations, (ii) determine a detected event and a type of event from their own observations, and (iii) transmit data of the detected event and the type of event to the display screen device 110 for display. In this implementation, the display screen device 110 may encode the detected event and/or the type of event before displaying. Alternatively, the sensors can generate sensor observations and transmit the generated sensor observations to the display screen device 110 for processing and displaying.

A sensor can detect and track objects on the road 105 through its field of view. Each sensor can include a field of view set by the designer of the system 100. For example, if sensor 102-1 corresponds to a LIDAR system, the field of view of the LIDAR system can be based on the type of parameters required for use, such as the point density, e.g., a distribution of the point cloud, field of view, e.g., angle in which the LIDAR sensor can view, and a line overlap, e.g., a measure to be applied that affects ground coverage. Other parameters for each of the sensors are also possible. In another example, if sensor 102-2 corresponds to a video camera, the field of view of the video camera can be based on the type of lens used, e.g., wide angle, normal view, and telephoto, for example, and the depth of the camera field, e.g., 20 meters, 30 meters, and 60 meters, for example.

In some implementations, the field of view of each sensor becomes important because the system 100 can be designed in a variety of ways to enhance monitoring of objects on the road 105. For example, a designer may seek to overlap fields of view of adjacent sensors 102 to ensure continuity for viewing the road 105 in its entirety. Additionally, overlapping field of view regions may facilitate monitoring areas where objects enter the road 105 through vehicle-on ramps or exit the road 105 through vehicle off-ramps, such as the divergent roadway 105-1. In other examples, the designer may decide not to overlap the fields of view of adjacent sensors 102 but rather, juxtapose the fields of view of adjacent sensors 102 to ensure the widest coverage of the road 105. In this manner, the system 100 can monitor and track more objects at a time.

In addition, each sensor can include memory and processing components for monitoring the objects on the road 105. For example, each sensor can include memory for storing data that identifies and tracks the objects identified in the order the objects appear to a sensor. The processing components can include, for example, video processing, sensor processing, transmission, and passive receiving capabilities. Each of the sensors can also communicate with one another over the network 106. The network 106 may include a Wi-Fi network, a cellular network, a Bluetooth network, an Ethernet network, or some other communicative medium.

The sensor data is provided to a system with intelligence that can determine events based on the sensor data, e.g., control unit of the display screen device 110. The determined events are used to generate the display data, and the vehicles can process the data to take action. Additionally, the central server 114 can receive the sensor data, process it, and provide the display data to the display screen device 110. Alternatively, the display screen device 110 can receive sensor data from one or more sensors in proximity to it, determine one or events from the sensor data, and generate the display data. The central server 114 can include one or more servers and one or more databases connected locally or over a network, e.g., database 116. The central server 114 can store data that represents the sensors 102, the display screen device 110, roadway events 118, sensor & display systems 120, and vehicle activities 122.

For example, the central server 114 can store data that represents the sensors 102 that are available to be used for monitoring. The data can indicate which sensors 102 are active, which sensors 102 are inactive, the type of data recorded by each sensor, and data representing each sensor's field of view, to name a few examples. Additionally, the central server 114 can store data identifying each of the sensors 102, such as for example, IP addresses, MAC addresses, and preferred forms of communication for each particular sensor. The data can also indicate the relative positions or locations of the sensors 102 in relation to one another. In this manner, a designer can access the data stored in the central server 110 to learn what sensors 102 are being used to monitor the objects/vehicles on the road 105 and pertinent information for each of these sensors 102.

In some implementations, the central server 114 can store the data that represents the sensors within a database 116. As illustrated in FIG. 1A, the database 116 can store data indicative of roadway events 118, the sensor & display systems 120, and vehicle activities 122. The data that represents the sensors can be included within the sensor & display systems 120. The data that represents the display screen device 110 can also be included within the sensor & display systems 120. Additionally, data associated with actions taken by vehicles 104 that traverse the road 105 can be included within the vehicle activities 122. For example, the database 116 can be partitioned into various segments, each of the segments corresponding to the roadway events 118, the sensor & display systems 120, and the vehicle activities 122. In other examples, the database 116 can store the data for each of the events 118, systems 120, and activities 122 in other various manners, such as in an indexed or compressed manner. The database 116 may be external or internal to the central server 114 and may include one or more storage devices. The database 116 can include one or more storage devices connected locally or connected over a cloud computer network.

Moreover, the central server 114 can store data representative of the display screen device 110 within the sensor & display systems 120. The data representative of the display screen device 110 can include identification data, such as, IP addresses, MAC addresses, and performed forms of communication for the display screen device 110. This data can also include how the display screen device 110 displays received sensor data, such as through QR codes, text messages, audio messages, real-time video feed, images, a combination of the above, and other communication means, to name a few examples. The central server 114 may also store historical information regarding the display screen device 110, such as, for example, prior data displayed by the central server 114 and prior sensor data received by the display screen device 110 from at least one of the sensors 102.

In some implementations, the database 116 can store data indicative of the vehicle activities 122. The vehicle activities 122 can include data transmitted by each vehicle's on-board sensor system to the central server 114. A vehicle, such as one of the vehicle's traversing the road 105, can transmit data to the central server 114 in response to capturing sensor data from the display screen device 110. For example, the display screen device 110 may display a QR code or real-time video of some event currently occurring on the road 105. The on-board sensor system of a vehicle, such as vehicle 104-2, may capture the QR code that encodes the event and the real-time video, and, upon decoding the data to determine the event, decide to take action in response to capturing the displayed data. As will be further described below, the vehicles on-board sensor system can transmit data indicative of the action taken by the vehicle. In some implementations, the vehicle's on-board sensor system can transmit data indicative of actions or statuses of the vehicle to the central server 114 independently of the display screen device 110.

In some implementations, the sensors 102 can generate observations regarding road actors on the road 105. For example, the sensors 102 can identify an object as the object enters its field of view. Based on the identification of the object, the sensors 102 can describe characteristics of the object. For example, the characteristics of the objects can include a location of the object on the road 105, a speed of the object, a relationship of the object to other surrounding objects, an abnormal event, a reflectivity of an object (to identify whether the object corresponds to icy road or fire), and a distance of the object to the sensor itself, to name a few examples. The sensors 102 can then communicate this information to the display screen device 110, where the display screen device 110 can display the received information to vehicles 104 traversing the road 105.

The display screen device 110 can include a control unit 111. The control unit 111 of the display screen device 110 can include one or more central processing units (CPUs), one or graphical processing units (GPUs), memory, and other components connected over one or more computer bus components. From a software standpoint, the control unit 111 can include one or more algorithms that can produce an event type from the received sensor data. The control unit 111 can analyze the sensor data and interpret an event type from the received sensor data. For example, the control unit 111 can provide real time video to a classifier and the control unit 111 can determine the video illustrates an icy road. Other examples are also possible.

In some implementations, the display screen device 110 can include one or more machine learning models that are trained to process and detect the events included in sensor data provided by the sensors. For example, a model may be trained to determine or recognize from observed data that a vehicle has crashed on the road 105 and a type of the event is a crash. In another example, a model can be trained to monitor and detect different rates of vehicle movements and identify when the rate changes. These rate changes can correspond to when a traffic jam has been identified or a traffic jam has cleared. In another example, a model can be trained to recognize variations in road surfaces, e.g., reflections, deformations, and others. The reflections can indicate water or ice on the road and deformations may indicate obstacles, cavities, and blockages that indicate areas on the road to be avoided. Models trained to recognize other events can also be used. The models can be implemented as a variety of machine learning algorithms and classifiers. These models can be trained in a variety of manners and conventional methods, such as being trained on the sensor data to recognize various events of various types.

In response to determining a type of the event from the received sensor data, the control unit 111 can display the type of the event on the display screen device 110. As mentioned, the control unit 111 can display the type of the event as a QR code, a textual message, a video, and one or more images. In some examples, the video or the images may be provided in substantial real-time or provided from a prior time.

During stage (A), the sensors 102 currently deployed at the road 105 can generate sensor data of objects or events they view in its field of view. The sensors can be deployed longitudinally along the road 105 to generate and monitor sensor data of road actors and other road events. The display screen device 110 can subsequently use this generated sensor data to determine a type of the event captured by the sensors 102 and display the type of the event to vehicles 104 traversing the road 105.

As illustrated in FIG. 1A, two vehicles 104-6 and 104-N crash at a particular location on road 105. In this example, the sensor 102-N can detect vehicle 104-6 crashing into vehicle 104-N. In particular, the sensor 102-N may capture sensor data of an event that indicates an abnormal driving type, such as speeding down the road 105, a collision on the road 105, a vehicle oriented in a wrong direction (e.g., flipped, on its side, or turned), a flash of light indicative of fire, or some other form of abnormal event at a particular location, to name a few examples. Other examples may also include, an animal crossing the road, a tree having fallen on the road 105, a transmission line down on the road 105, a broken down vehicle, or unsafe weather conditions. The unsafe weather conditions can include, for example, severe weather such as heavy rain, thick fog, sleet, snow (light or heavy), or other weather types. In other examples, the identification of a sensor can also correspond to identification of a gas station, a mechanic shop, a dealership, or some other shop where a vehicle can obtain vehicular service.

The sensor 102-N can capture sensor data of the vehicular crash in various forms. The forms may include real-time video, images, LIDAR data, radar data, infrared data, audio data, and other forms of data. The sensor 102-N can store values associated with each of these data types, such as voltage values, current values, and other data types. The sensor 102-N can notify the other sensors, e.g., sensors 102-1 through 102-6, of the detected event by communicating the captured sensor data to the other sensors over the network 106.

In some implementations, the sensors positioned along these roads can generate sensor data as they detect road actors traversing the road 105. For example, the sensor data correspond to an identification of a vehicle type, characteristics of detected vehicles, vehicular congestion, erratic vehicle driving behavior, and other vehicle characteristics. Additionally, the identification of the vehicle type can correspond to, for example, a truck, a sedan, a minivan, a hatchback, an SVU, and others. The identification of the vehicle type can be based on a size of the vehicle. Characteristics of the vehicle can include, for example, vehicle color, vehicle size, wheelbase distance, and length, height, and width of vehicle. Vehicular congestion can describe a measure of an amount of traffic and a movement rate of the particular traffic on the road 105. Erratic vehicle driving behavior can describe a vehicle's driving behavior in relation to the average driving behavior of the surrounding vehicles.

In some implementations, the sensors 102 deployed along road 105 can generate sensor data at various intervals. For example, each time a sensor detects a vehicle in its field of view, that particular sensor can generate the sensor data with little to no delay time. In response to generating the sensor data, the sensor can transmit the generated sensor data to the next sensor in the longitudinal direction along the same roadway to confirm that it also detects similar sensor data. The next sensor can receive the sensor data and perform a similar process of generating its own sensor data when it detects a vehicle in its field of view. Then, when the next sensor determines it is seeing the same road actor as indicated by the sensor data it received from the prior sensor, the next sensor can pass its generated sensor data to the subsequent sensor down the longitudinal line on the road 105. In this manner, the generated sensor data remains highly accurate because each sensor on the road 105 can confirm the prior sensor's generated sensor data. In other examples, the sensors can generate sensor data on a time or periodic basis, such as once every 2 seconds. When generating sensor data on the periodic basis, the sensors can reduce their bandwidth utilization and processing, but may ultimately include less accurate sensor data results.

During stage (B), the sensor 102-N can transmit the generated sensor data 108 to the display screen device 110. In particular, the sensor 102-N can transmit the captured sensor data 108 to the display screen device 110 over the network 106. In some implementations, a sensor can transmit the captured sensor data to the central server 114 for storage purposes each time the sensor transmits the captured sensor data to the display screen device 110. The central server 114 can then track sensor data captured by the sensors. When the central server 114 receives the captured sensor data, the central server 114 can store the received sensor data within the roadway events 118 of the database 116.

In some implementations, a sensor may only transmit the generated sensor data to the display screen device 110 upon multiple sensors validating the same sensor data. For example, sensor 102-5 may detect vehicle 104-6 driving in a particular manner, e.g., erratically, and transmit the generated sensor data to the sensor 102-6. Sensor 102-6 may detect vehicle 104-6 driving erratically by generating sensor data indicating the same, compare its generated sensor data to the sensor data it received from sensor 102-5, and in response to determining the sensor data is similar to a threshold, the sensor 102-6 may transmit its generated sensor data to sensor 102-N. Sensor 102-N can perform a similar process and if its generated sensor data matches, the sensor 102-N can transmit its generated sensor data to the display screen device 110. In other implementations, the sensors may use the display screen device 110 to detect and validate events from sensor data and notify other sensors of the detected event.

The system 100 may employ a method where a predefined number of sensors must validate the same sensor data before transmitting to the display screen device 110. In the above example, the number before transmitting to the display screen device 110 is 3. Other examples are also possible. Generally, each time an event is detected, the sensors can maintain track of a number of times each sensor detects the same event. When that number reaches the predefined threshold value, e.g., 3 in the above example, the display screen device 110 is notified of the event by the last sensor to detect the event. Alternatively, in other implementations, a sensor can transmit the sensor data to the display screen device 110 each time the sensor generates sensor data.

During stage (C), the display screen device 110 can receive the generated sensor data from the sensor 102-N. For example, the display screen device 110 may receive the captured sensor data specifically from the sensor 102-N over the network 106. Alternatively, the display screen device 110 may receive a notification from sensor 102-N, the notification (i) indicating that sensor 102-N has transmitted captured sensor data to the central server 114 and (ii) a location where the captured sensor data has been stored in the database 116. In this alternative example, the display system can retrieve the captured sensor data from the particular location in the database 116 and process the retrieved sensor data. By storing the captured sensor data in the database 116 before processing is performed by the display screen device 110, the central server 114 can track any of the events detected by the sensors 102.

In some implementations, a sensor may indicate that the central server 114 has updated sensor data for the display screen device 110 to process. In this case, the display screen device 110 can request the updated sensor data from the central server 114. For example, the display screen device 110, and more specifically, the control unit 111, can send a request to the central server 114 requesting for the updated sensor data in response to receiving a notification from sensor 102-N. The control unit 111 can include within the request an indication that sensor 102-N recently provided updated sensor data to the central server 114. In response, the central server 114 can obtain the updated sensor data from the database 116 using an index. The central server 114 can build an index based on a descriptor of sensor 102-N and other data, such as a timestamp when the sensor data was generated by the sensor and/or received by the central server 114. The central server 114 can then transmit the updated sensor data to the display screen device 110 over network 106 to be processed and displayed to notify vehicles 104 on road 105.

During stage (D), the display screen device 110 receives the generated sensor data. As discussed above, the display screen device 110 may receive the generated sensor data from a particular sensor, e.g., sensor 102-N as illustrated in FIG. 1A, from multiple sensors, or from the central server 114. In particular, the control unit 111 of the display screen device 110 can obtain the generated sensor data and processes the sensor data to determine an event type of the sensor data.

The control unit 111 can include one or more algorithms, trained or untrained, that can determine an event type from the generated sensor data. First, the control unit 111 can determine a type of the generated sensor data, because the process by which the control unit 111 determines the event type can differ based on the type of sensor data. For example, if the generated sensor data is a real time video or an image, the control unit 111 can provide the real time video to a classifier and the classifier can output a prediction of an event type shown in the video, e.g., icy road, car crash, fire hazard, a downed transmission line, or some other hazard. In another example, if the generated sensor data is LIDAR data, the control unit 111 can provide the LIDAR point cloud data to an algorithm that extracts the relevant data and combines the data into a trajectory file, which can then be used to model in three dimensions and determine the event type. In another example, if the generated sensor data is Radar data, the control unit 111 can provide the Radar data to radar object detection and classification algorithms for outputting a type of object detection and classification for the objects. Other examples are also possible.

In some implementations, the control unit 111 can correlate the output from processing the generated sensor data with event types. The control unit 111 may store a set of potential event types and ranges of scores associated with each of the event types. For example, an icy road event may have a score ranging from 0-20, a fire hazard may have a score ranging from 21-40, bad weather (e.g., fog, hail, rain, lightning, or thunder) may have a score ranging from 41-60, a downed tree or transmission line may have a score ranging from 61-80, and erratic driving behavior may have a score ranging from 81-100. Other examples and score ranges are also possible. The scores can indicate a likelihood of a particular event. For example, score of 0 indicates a strongest likelihood of an icy road event, and a score of 80 indicates the weakest likelihood of a downed tree or transmission line. Thus, the control unit 111 can score the output values on a sliding scale and determine the event based on the value of the score.

The control unit 111 can compare the output score to threshold values to aid in determining the event type. Specifically, the control unit 111 may compare the score value to a threshold value to determine the event. For example, the control unit 111 may set a threshold value of 5 to improve the accuracy of the system. In this example, the ranges for each event shrink by a value of 5—so, an icy road has a score ranging from 0-15, fire hazard from 16-35, and so on. The greater the threshold, the more accurate the control unit 111's algorithms are at determining event types. Alternatively, the smaller the threshold, the less accurate the control unit 111's algorithms are at determining event types. In some implementations, the control unit 111 does not rely on threshold values and selects the event type based on the output score.

During stage (E), the control unit 111 can display data representative of the determined event type. The control unit 111 can display data that indicates a QR code, a textual message, a real time video of the event, and one or more images of the event. The control unit 111 can encode the data representative of the determined event type to be displayed by the display screen device 110 in the form of a QR code, for example. In some examples, the control unit 111 can display data in one or more of the ways mentioned above. For example, as illustrated in system 100, the control unit 111 displays a QR code and a textual message on the display screen of the display screen device 110 that indicates a "car crash detected" as illustrated during stage (A). In other examples, the control unit 111 can display the real time video of the event recorded by the particular sensor, a QR code, and a textual message. Other examples and combinations of the data types can also be displayed.

In some implementations, the displayed data is sufficiently large enough to be viewed and comprehended by the drivers and on-board sensors of the vehicles. For example, the size of the display screen device 110 can range from values including, but not limited to—12×6 ft, 22×10 ft, 36×10.5 ft, 50×20 ft, and 60×16 ft, to name a few examples. The size of the QR code, the real time video, the images, and the textual message can fit within the size of the display screen device 110 and not be larger than the size of the display screen device 110. In this manner, the on-board sensors in the vehicles or the drivers of the vehicles can clearly read and interpret the data displayed on the display screen device 110. Moreover, the on-board sensors or the drivers of the vehicles can have ample time to adjust their driving behavior before approaching a location of the event on the road 105.

In some implementations, the display screen device 110 can control how the data is displayed and what is displayed. Specifically, the display screen device 110 can include an array of indicators of uniform size, the indicators can display information determined from the detected sensor data. The display screen device 110 can include an N-by-N display of indicators, where N can range from 1 to 100, for example. Other values of N are also possible. The display of indicators can cover the entirety of the display system 100 in width and height. The indicators may include, for example, a cell or component on a display screen for displaying data.

Each indicator can be intentionally machine readable and highly visible. For example, each indicator can display a QR code or some other design form to display information to vehicles' that pass by the display screen device 110. The indicators can work collectively with neighboring indicators on the display screen device 110 to display information. For example, a 5×5 display of indicators on the display system can be used to display a single QR code, a video, an image, or text based on the data captured by the sensors. Other example sizes of indicators on the display screen device 110 are also possible for the purposes of displaying information of detected sensor data to the vehicles 104.

In some implementations, the display screen device 110 can control the manner in which data is displayed. For example, the display screen device 110 may control a size, a refresh rate, a glare control amount, and other characteristics of the display screen device 110 in response to detecting extrinsic conditions. Specifically, the display screen device 110 can adjust a size of the data to display by adjusting the number of indicators used to display information. For instance, the display screen device 110 may use a 3×3 display of indicators for a QR code. In another example, the display screen device 110 can use a 10×10 display of indicators for a video recorded by the sensors to show an event detected up ahead on the road 105. The display screen device 110 can also adjust its refresh rate. For example, the display screen device 110 may adjust a refresh rate between values of 60 Hz to 144 Hz. Other values outside this range are also possible.

In some cases, the display screen device 110 can control an amount of glare on its screen. In particular, the display screen device 110 can adjust the screen's tilt and swivel mechanisms to reduce the amount of glare or reflection that bounces off the screen. The display screen device 110 can measure an amount of brightness received by the screen and in response, tilt, or swivel the screen to reduce the amount of brightness received so passing vehicles can clearly interpret data displayed by the display screen device 110. The display screen device 110 can use software and hardware components to detect the amount of brightness as it adjusts the tilt and swivel of its screen to ultimately reduce the glare and brightness given off by its screen.

Moreover, the display screen device 110 can tune an amplitude and frequency of the display to be amenable to extrinsic or environmental conditions other than glare. For example, the display screen device 110 can detect proximate weather conditions, e.g., rain, snow, darkness, fog, and others, and adjust characteristics of its screen to improve visibility for vehicles. The display screen device 110 can increase a brightness and frequency of the display data components when rain or fog is detected so vehicles can view the displayed data in the midst of rain or fog. When the display screen device 110 detects snow, for example, the display screen device 110 can decrease a brightness of its screen to reduce glare that may present on the screen from the sun's reflection off snow and onto the screen. Other examples are also possible.

The display screen device 110 can also rank information to be displayed on its screen based on a type of event detected from the sensors. Ranking information enables vehicles to obtain important information about upcoming road events in an ordered manner. For example, the display screen device 110 may determine from the sensor data that 50 yards from the location of the display screen device 110 a vehicle crash was identified, and 400 yards from the location of the display screen device 110 there is an exit for a gas station. In this example, the display screen device 110 can display these notifications in a ranked manner, e.g., the notification about the vehicle crash is above the notification about the gas station ahead. Alternatively, the display screen device 110 can display these notifications in other ranked manners, e.g., the notification about the vehicle crash is much larger than the notification about the gas station ahead, signifying proximity to the events. The display screen device 110 can also display notifications about detected events based on a matter of importance. For example, the display screen device 110 can determine that a vehicle crash, which is 400 yards ahead, is more relevant to vehicles traversing the road 105 than an identification of a gas station, which is 50 yards ahead. As such, the display screen device 110 may display the event of the vehicle crash in a manner to signify its importance over the identification of the gas station. This ranked displaying can be created through a list order, a size difference, or a color scheme to indicate ranked matter of events. The display screen device 110 can display other events in other ranking fashions to signify to drivers the different detected events.

Similarly, the display screen device 110 can control the order of displayed events based on type of events. For example, the display screen device 110 may rank events in order of most severe to least severe based on the order of the following categories—severe hazards, control hazards, congestive notifications, and convenience notifications. The display screen device 110 can use a trained classifier, such as a trained machine learning to model, to identify whether a detected event falls into one of these aforementioned categories. For example, if the display screen device 110 detects three events that fall into the categories of severe hazards, control hazards, and congestive notifications, then the display screen device 110 displays the three events in their respective order on the display—(1) severe hazards, (2) control hazards, and (3) congestive notifications. The events may be displayed in a ranked order in any manner described above, such as through listings, size differences, color schemes, or any other manner.

In some implementations, the display screen device 110 can adjust the size of notifications to ensure visibility from long distances. In particular, when an implementer of the system 100 installs a display screen device 110, the implementer can set a size of the notifications to be displayed based on an ability of vehicles to view the notifications. After installation, the display screen device 110 can adjust the size of its notifications based on, for example, a type of event detected, an instruction from the implementer to adjust the sizes, or a determination of extrinsic factors, e.g., weather and others, that the size of notifications should be adjusted. Adjusting the size of the notifications can include, for example, adjusting a number of indicators on the screen used for a particular notification.

In some implementations, the display screen device 110 can control the periodicity of notifications to ensure visibility of notifications proportional to underlying roadway speed. The display screen device 110 may determine from the sensors or from an indication on the roadway the speed at which vehicles 104 are traversing the road 105. In response, the display screen device 110 can determine whether the (i) size, (ii) rate, and (iii) frequency at which notifications are displayed on the screen is sufficient for vehicles to obtain and interpret such displayed notifications. For example, if the display screen device 110 determines that vehicles travel fast, e.g., greater than 70 MPH, then the display screen device 110 may decrease the frequency at which the notifications are displayed. By decreasing the frequency at which the notifications are displayed, the time with which the notifications are displayed increases, since time is the inverse of frequency. Alternatively, if the display screen device 110 determines the vehicles travel slow, e.g., slower than 30 MPH, then the display screen device 110 can increase the frequency at which the notifications are displayed, e.g., decreasing the time the notifications are displayed. By increasing the frequency of notifications to be displayed, different notifications can be displayed in a shorter amount of time. Additionally, the vehicles may be able to observe multiple notifications when the frequency is increased. The display screen device 110 can ensure that vehicles see high priority notifications by, in some cases, (i) making the notifications larger, e.g., having visibility at longer ranges, and (ii) modulating the refresh rate of the display screen device 110 so that the highest priority indication is visible for a longer period (smaller frequency).

In some cases, the display screen device 110 can control the periodicity and frequency with which notifications are displayed to ensure visibility from long distances. In particular, the display screen device 110 can adjust the periodicity and frequency with which notifications are displayed to improve the visibility for vehicles over long distances. Greater periods and smaller frequencies can be helpful for vehicles that are farther away. Alternatively, smaller periods and greater frequencies can be helpful for vehicles that are closer to the display screen device 110. Vehicles visibility is typically improved when the vehicles pass closer to the display screen device 110, and as such, do not require longer periods of notification display.

In some implementations, the system 100 may include multiple display screen devices positioned in fixed locations relative to road 105. Each display screen device may be positioned in an orientation relative to the road 105 so that the respective screens are viewable by each vehicle from the road 105. A display screen system can include the multiple display screen devices and the central server 114. Additionally, each display screen device can be positioned at a predetermined distance apart from one another. When one or more of the sensors generates sensor data and provides the sensor data to the display screen device 110 to detect an event on the road 105, the sensor can transmit data indicative of the event to each of the display screen devices. Alternatively, the sensor can transmit data indicative of the event to one of the display screen devices and that one display screen device propagates the data indicative of the event to the other display screen devices over network 106. By positioning multiple display screen devices along the road 105, the vehicles 104 can view the information detected by the sensors 102 at various intervals along the road 105. This redundancy of information is helpful in case the vehicle misses the information display by one display screen and can obtain the same information at the next or subsequent display screen.

Moreover, system 100's use of multiple display screen devices are helpful in the case that information changes as the vehicle traverses the road 105. For example, first and second display screen devices that are spaced 100 meters apart may that a vehicle crash is detected up ahead. Vehicle 104-2 may drive past the first display screen device and the second display screen device and obtain sensor information from both display screens of the first and second display screen devices indicating vehicle crash ahead. Vehicle 104-2's on-board sensor system can then take the necessary steps to adjust a behavior of vehicle 104-2, such as changing a course of vehicle 104-2. However, as the vehicle 104-2 drives past a fourth and fifth display screen, the on-board sensor system of vehicle 104-2 determines from the sensor data that the crash no longer exists, i.e., the police have properly cleaned up the crash. The on-board sensor system can then cancel or disengage the adjustment of the vehicle 104-2's behavior and continue on the road 105. Other examples are also possible.

Figure 1B:
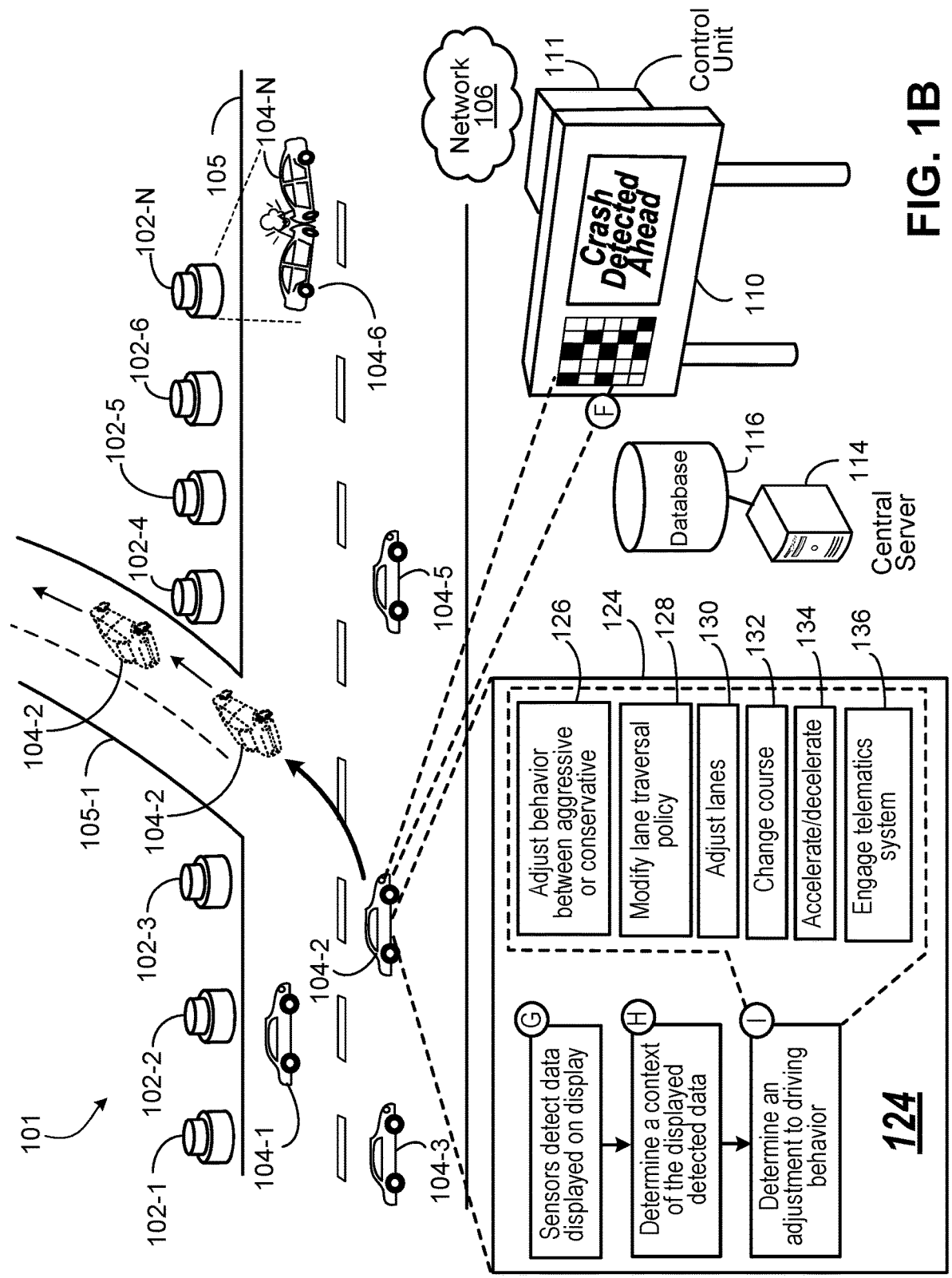

FIG. 1B is a block diagram that illustrates an example of system 101 that consumes and processes data in an intelligent transport system. System 101 is a continuation of system 100. Specifically, system 101 includes similar components to system 100—namely, sensors 102, vehicles 104, network 106, display screen device 110, control unit 111, central server 114, and database 116. Additionally, system 101 includes an on-board sensor system 124, which may be included within each of the vehicles 104 of systems 100 and 101. FIG. 1B illustrates various operations in stages (F) through (I), which can be performed in the sequence indicated or another sequence. The operations performed with respect to stages (F) through (I) can be performed in a sequence with stages (A) through (E), as describes in system 100.

The on-board sensor system 124 includes circuitry that houses the intelligence for a particular vehicle. In the example of FIG. 1B, the on-board sensor system 124 is included within vehicle 104-2. An on-board sensor system can include one or more circuits for obtaining sensor data from external and internal to the vehicle. The one or more circuits can be positioned in various locations throughout the vehicle to obtain sensor data that the vehicle can use to decide future actions and/or behavior of the vehicle. For example, the one or more circuits can be one or more sensors such as infrared sensors, video cameras, LIDAR sensors, proximity sensors, radar sensors, and wireless communication sensors. The one or more circuits can obtain sensor data that include, for example, proximity to other vehicles while traveling the road 105, detection of objects or people within proximity to the on-board sensor system, and other object detection measures. Additionally, the one or more circuits can read data from billboards, traffic signs, traffic lights, and other indicators that provide information for the vehicle. The one or more circuits on the on-board sensor system can provide this sensor data to a central processor that houses the intelligence of the vehicle and decides how to interpret the obtained sensor data.

The one or more circuits can be connected to a central processor that obtains the sensor data from each of the vehicles and produces output decisions regarding vehicle behavior and actions. For example, the central processor may include one or more central processing units and one or more graphical processing units working collectively to process large amounts of sensor data. The central processor of the on-board sensor system can receive the sensor data, interpret the sensor data, and provide instructions to the vehicle. The central processor can also communicate with the infrastructure of the vehicle. For example, the central processor may communicate with the infrastructure of the vehicle using a controller area network (CAN bus) protocol. The CAN bus protocol enables the central processor to communicate with various components of the vehicle, e.g., autonomous driving functions, advanced driver assistance system (ADAS), transmission, airbags, antilock braking/ABS, cruise control, electric power steering, audio system, power windows, doors, mirror adjustments, battery, and recharging systems for hybrid/electric cars. The central processor can also communicate with various functions of the vehicle through the CAN bus system such as, for example, auto start/stop, electric parking brakes, parking assist systems, auto lane assist/collision avoidance systems, auto brake wiping, and communicate with the functionality of the sensors placed through the vehicle.

Each vehicle can include the on-board sensor system which includes the ability to communicate bi-directionally with components external to the vehicle. For example, the on-board sensor system can include one or more wireless communicator components, e.g., ZigBee components, Bluetooth components, Wi-Fi components, and others, that enables the on-board sensor system to communicate with the central server 114 and the display screen device 110 over the network 106. The vehicles can communicate with the external components while traversing the roadway. Moreover, the vehicle's on-board sensor system may communicate with a cellular device. For example, the vehicle's on-board sensor system may include a $4^{th}$ and $5^{th}$ Generation Wireless Card that enables the on-board sensor system to communicate with cellular devices via cellular towers. In this manner, the functionality of the on-board sensor system may be controlled by an external component that can communicate with it, such as through an application of a mobile device that communicates over cellular or Wi-Fi. Other components may also communicate with the on-board sensor system, such as a laptop, a tablet, a personal computer, or other devices.

During stage (F), the display screen device 110 displays data indicative of an event detected by the sensors. In particular, the display screen device 110 displays a QR code (encoded the data of the detected event) and a message that recites "Crash Detected Ahead," as detected and reported by sensor 102-N over 106. The display screen device 110 displays the QR code to be read by on-board sensor systems of vehicles traversing the road 105, and in particular, the vehicles are approaching the display screen device 110. The display screen device 110 displays data indicative of events that have occurred on the road 105 that at least some of the vehicles on road 105 have not yet seen. For example, in system 101, the on-board sensor system of vehicle 104-5 may be able to detect the vehicle crash between vehicles 104-6 and 104-N. However, the on-board sensor systems of vehicles 104-1, 104-2, and 104-3 may be too far away to detect the vehicle crash and may be unable to avoid traffic. By displaying data indicative of the crash on the display screen device 110, the vehicles 104-1, 104-2, and 104-3 can read and interpret the display of display screen device 110 and take actions based on the interpretation of the data.

During stage (G), the on-board sensor system for each vehicle can view and obtain the data from the display screen device 110. In particular, the on-board sensor system can detect data being displayed on the display screen device 110. The detection can be performed by analyzing sensor data of the display screen device 110 obtained from the sensors on the on-board sensor system. The central processor of the on-board sensor system can determine whether the display screen device 110 displays data representing a QR code, data from real time video, imagery data, and/or textual data, or some combination of the above. If the central processor determines the display screen device 110 illustrates some form of detection of data, then the on-board sensor system can determine a context of the sensor data.

During stage (H), the on-board sensor system can determine a context of the displayed detected data. For example, if the data displayed by the display screen device 110 is only real-time video or one or more images, then the on-board sensor system can determine a context of the real-time video or images. In this example, the on-board sensor system can provide the real-time video or one or more images through an object classifier to determine a context of the video or an object seen in the video. The object classifier can indicate bad weather is shown in the video, e.g., hail, rain, fog, lightning, or high humidity due to haziness of video. In another example, the object classifier can indicate a car crash if the video or images shows wreckage of one or more vehicles.

In other examples, the on-board sensor system's determination of the context of the displayed detected data can be improved if the display screen device 110 provides a textual message with the displayed real-time video or images. For example, the display screen device 110 may display the real-time video or images showing a wreckage of one or more vehicles on the road and a textual message indicating "Crash Detected Ahead." The on-board sensor system can obtain sensor data from the display screen device 110 that includes the real-time video and the textual message and provide the sensor data to an object classifier to identify an object in the video. The classifier may be fed the textual message to improve the classifier's classification of the video. If the classifier does not detect wreckage in the video, but the textual message indicates there is a crash in the video (or a crash ahead), then the on-board sensor system can retrain its classifier with the real-time video and a label that indicates this real-time video illustrates wreckage to improve the accuracy of the classifier for future detections.

In other examples, the on-board sensor system determination of the context of the displayed detected data can also be enhanced if the display screen device 110 displays a QR code for the on-board sensor system to view. For example, the display screen device 110 may display a QR code that indicates there is a "Crash Detected Ahead." The display screen device 110 can display the QR code in a standard that can be understood by the on-board sensor system. For example, the on-board sensor system can capture a text message, an image or video of the QR code on the display screen device 110, and the on-board sensor system can interpret the QR code to determine its context. In the case of system 101, the context of the QR code can indicate a Crash Detected Ahead. In the event that the car is driven by a driver and not driven automatically, the display screen device 110 can also provide a textual message along with the QR code so that a driver can interpret the message displayed on the display screen device 110. In some implementations, the on-board sensor system can also interpret both the QR code of the encoded data and the textual message. The on-board sensor system can capture the textual message from the display screen of the display screen device 110 and perform optical character recognition (OCR) to determine a context of the message displayed by the display screen device 110. The on-board sensor system can use the OCR results to indicate how to adjust the driving behavior of the vehicle.

During stage (I), the on-board sensor system can determine an adjustment to a driving behavior of the vehicle based on the obtained data from the display screen device 110. The on-board sensor system may decide actions to take based on a set of actions available. The actions can be ranked and selected based on a current configuration of the road 105 the vehicle is currently driving. In some cases, the on-board sensor system can select an action for the vehicle to take based on a likelihood that the action will most likely avoid the event displayed by the display screen device 110.

System 101 illustrates some of the actions the on-board sensor system can take to adjust the vehicle's driving behavior. For example, one of the actions can include the on-board sensor system may decide to perform a no-operation (no-op) and continue on its path. In another example, the on-board sensor system may decide to adjust a behavior of the vehicle 126, where the behavior can be switched between an aggressive or conservative driving behavior. In other examples, the on-board sensor system can modify a lane traversal control policy 128, adjust or change lanes 130, change course 132, accelerate/decelerate 134 the vehicle's speed and/or engage a telematics system 136 of the vehicle. Other examples are also possible, such as the on-board sensor system activating or deactivating particular features of the vehicle, such as the electronic stability control or the anti-lock braking system.

As illustrated in system 101, the on-board sensor system of vehicle 104-2 can decide to change vehicle 104-2's course 132 after detecting the display screen device 110's indication of a crash at a particular location up ahead. The on-board sensor system may determine a location of the crash from the sensor data obtained from the display screen device 110. The on-board sensor system can determine from the location that the vehicle 104-2 is a particular distance from the crash, e.g., 2 miles, and decide to take action to avoid the crash, and subsequent traffic associated with the crash.

For example, the on-board sensor system can decide to take an alternative route to reach the destination and avoid the vehicular crash. The alternative route can include exiting the road 105 and traversing down road 105-1. In response, the vehicle 104-2 can proceed to exit the road 105 and traverse down road 105-1 (as illustrated by the dotted representation of vehicle 104-2 traversing road 105-1), to circumvent the crash between vehicles 104-6 and 104-N. In this case, the on-board sensor system of vehicle 104-2 can decide to change course by traversing road 105-1 that eventually returns to road 105 after the location of the accident.

In other examples, the on-board sensor system can determine an adjusted behavior of the vehicle between aggressive and conservative 126 modes. For example, the on-board sensor system can adjust how its corresponding vehicle reacts to other vehicles on the roadway by adjusting the vehicle's driving strategy to become more conservative or more aggressive, based on a type of the event detected. If the display system indicates an erratic driver or a vehicle accident is detected ahead, then the on-board sensor system may adjust the driving behavior to be more conservative or cautious to decrease the likelihood of a future accident and to allow its vehicle more time to process sensor events. Alternatively, if the on-board sensor system detects an event that indicates an increase in speed due to a newly identified traffic sign, then the on-board sensor system may adjust the driving behavior of the vehicle to be more aggressive to increase the speed of the vehicle to match the speed indicated by the identified traffic sign.

In another example, the on-board sensor system can adjust a lane traversal control policy 128 of the vehicle. The lane traversal control policy 128 can indicate a position or portion in the lane where the vehicle drives along the road 105, such as in the center of the lane, the left side of the lane, and the right side of the lane. For example, the on-board sensor system can modify the lane traversal policy so that the center axis of the vehicle (parallel to the vehicle's transmission or in the longitudinal direction of the vehicle) moves from the center of a lane on road 105 to the left side of road 105 (or another side of the road 105). In other examples, the on-board sensor system can modify the lane traversal policy so that either (i) the left axis of the vehicle or (ii) the right axis of the vehicle, both parallel to the vehicle's longitudinal direction, follows a particular portion of the lane of the road, e.g., either the left, right, or center of the road.

For example, the on-board sensor system may determine from the event displayed by the display screen device 110 that a patch of black ice has been identified on the left side of a lane. The on-board sensor system can determine that its vehicle is driving in the same lane and that the center longitudinal axis of the vehicle needs to move to the right side of the lane to avoid the patch of black ice located down the road at the event location. In another example, the on-board sensor system may determine from the event displayed by the display screen device 110 that a transmission line has fallen on the road and is laying on the right side of a lane. The on-board sensor system can determine that its vehicle's center longitudinal axis is driving in the same lane and that the vehicle's center longitudinal axis needs to move to the left side of the lane to avoid the fallen transmission line located down the road at the event location. Ultimately, the on-board sensor system can adjust the lane traversal control policy 128 of the vehicle sufficiently enough to ensure the vehicle does not come in contact with the identified object at the event location, e.g., the patch of black ice, the fallen transmission line, and other objects.

In another example, the on-board sensor system can decide to adjust the lane 130 a vehicle is driving in to another lane. The on-board sensor system may determine from the event displayed by the display screen device 110 that one or more objects, e.g., dead animal, car crash, a rock, boulder, or construction, to name a few examples, take up an entire lane on the road 105. The on-board sensor system can determine that the vehicle is currently driving in the same lane in which the object is located, and that the object is up ahead. In some example, the on-board sensor system can determine a distance to the object based on a GPS location of the event provided in the QR code and a current location of the vehicle. The on-board sensor system can then determine an amount of distance between the vehicle and the location of the event before having to switch to another lane to avoid the event. In this manner, the on-board sensor system can ensure sufficient distance exists before having to switch lanes in order to switch lanes in a safe manner. In some examples, the on-board sensor system can instruct the components of the vehicle to move to another lane in the road 105, such as one or more lanes to the left of the current lane or one or more lanes to the right of the current lane.

In another example, the on-board sensor system can decide to accelerate or decelerate 134 the vehicle based on an event displayed by the display system. In particular, the on-board sensor system can accelerate or decelerate the vehicle to a different speed based on the event. For example, if the display screen device 110 displays data of an event that indicates traffic jam ahead, then when the on-board sensor system obtains this information, the on-board sensor system can decelerate the vehicle's speed to approach the traffic jam at a lower speed. Alternatively, if the display screen device 110 displays data of an event that indicates traffic begins to speed up ahead, then when the on-board sensor system receives this information, the on-board sensor system can approach the vehicle's speed as the vehicle approaches the area of increased speed to ensure the vehicle does not impede the flow of traffic.

The on-board sensor system can also accelerate or decelerate the speed of the vehicle based on other detected events. For example, if the display screen device 110 indicates that a school is in session up ahead at a particular location, then this information may in turn signal to the on-board sensor system to decelerate from its current speed to a lower speed when entering the particular location. In other examples, if the display screen device 110 indicates that police are located a distance ahead, then the on-board sensor system can reduce or increase the speed of the vehicle to an appropriate speed, e.g., matching the speed sign or matching a speed indicated by the display screen device 110, to ensure the vehicle does not draw attention to the police.

In some implementations, the on-board sensor system can engage or disengage a telematics system 136 of the vehicle in response to obtaining and processing sensor data from the display screen. The on-board sensor system can engage the telematics system to receive and transmit messages from and to other vehicles as well as the central server 114. Alternatively, disengaging the telematics system ensures the vehicle cannot communicate externally with other vehicles or the central server 114. Thus, if the on-board sensor system of a vehicle determines from the data displayed by the display screen device that vehicle communication is required, then the on-board sensor system can engage the telematics system of the vehicle.

For example, if the on-board sensor system determines that the display screen device 110's display information that describes a gas station is up ahead, then the on-board sensor system can enable the telematics system, so that the vehicle's telematics system can relay an amount of gas available to an external component, such as the central server 114. The central server 114 can determine whether the vehicle should stop to get gas at the gas station ahead based on the amount of gas available in the vehicle, and transmit a notification to the on-board sensor system of the vehicle over network 106 notifying the vehicle should stop to get gas, based on the central server 114's determination.

In another example, the on-board sensor system may determine from the display screen device 110 that a toll is ahead and the vehicle must pay in order to drive on the tolled portion of the road 105. In response, the on-board sensor system can enable or engage the telematics system, so that the vehicle's toll can be paid for driving on the tolled portion of road 105. The vehicle's toll is paid when the vehicle passes underneath the sensor, the sensor transmits a request to the vehicle's telematics system, the vehicle's telematics system responds to the request with vehicle identification information, and the sensor uses the vehicle identification information to credit an account associated with an owner of the vehicle.

In some implementations, the on-board sensor system can include an object detection model. The object detection model can be trained to produce an object type identified in the obtained sensor data using data inputs from each of the sensors found on the vehicle. For example, the sensors on the vehicle may include, but are not limited to, a LIDAR system, a radar system, a video camera, and a network connectivity system. The on-board sensor system can provide the data inputs from each of the sensors on the vehicle as input to the object detection model.

In response, the object detection model can output a detection of one or more objects in the input sensor data. For example, the object detection model can an output in an indication that the sensor data includes textual data, e.g., "Crash Detected Ahead," and includes a QR code, e.g., the QR code shown on the display screen device 110 in system 101. In response, the object detection model can take the appropriate processes to process the QR code and extrapolate its contents with the use of the context of the textual data.

Moreover, the output of the object detection model can be used to adjust the characteristics of the sensors. If the on-board sensor system determines the output of the object detection model is not meaningful, then the on-board sensor system can adjust the characteristics of the sensors. Adjusting the characteristics of the sensors can include adjusting a manner in which the sensors perceive objects in an environment. For example, a vehicle that is warned of a dust storm, fog, and other severe weather ahead might add an additional gain or weight value to inputs from Radar to the object detection model. The additional gain or weight can indicate to the object detection model to prefer Radar inputs to other inputs. In other examples, a vehicle warned of severe weather ahead by the display screen device 110 may change exposure of camera to improve visibility, such as by switching to low light mode or changing the focal lens of the camera. Additionally, the on-board sensor system can adjust a density of the point cloud of the LIDAR system if the vehicle is warned of glass on the road ahead. If the density of the point cloud is enhanced or increased, then the accuracy of the LIDAR system may improve as more pieces of glasses may be able to be identified by the object detection model. These "weights" can be adjusted for providing inputs to the object detection model. By improving the detection of the pieces of the glass, the on-board sensor system can navigate the vehicle around the pieces of glass to avoid any tire punctures.

Figure 2:
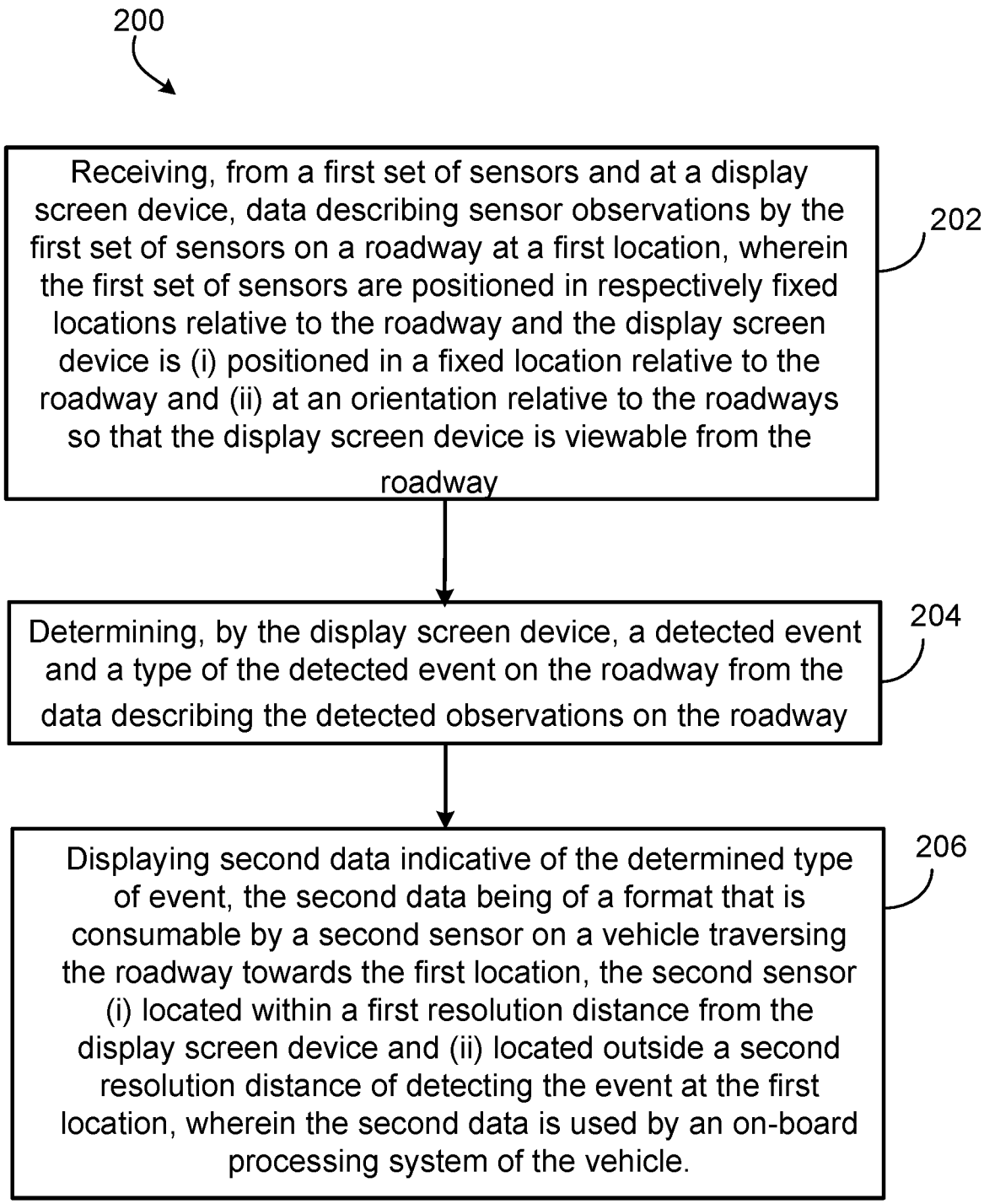
FIG. 2 is a flow diagram that illustrates an example process performed by a display screen device for processing and displaying data received from sensors monitoring a roadway.

FIG. 2 is a flow diagram that illustrates an example process 200 performed by a display screen device, e.g., display screen device 110, for processing and displaying data received from sensors monitoring a roadway.

The process 200 includes receiving, from a first set of sensors and at a display screen device, data describing sensor observations by the first set of sensors on a roadway at a first location (202). The first set of sensors are positioned in respectively fixed locations relative to the roadway and the display screen device is positioned in a fixed location relative to the roadway and at an orientation relative to the roadway so that the display screen device is viewable from the roadway. For example, the display screen device may receive sensor data, e.g., LIDAR and/or video data, from one or more sensors of a vehicle crash on a roadway.

The process 200 determines a detected event and a type of the detected event on the roadway from the data describing the detected observations on the roadway (204). For example, the display screen device can provide the data describing the detected observations to one or more ML models to determine the detected event and a type of the detected event on the roadway. The one or more ML models can output that the sensor data includes an event, such as a vehicular crash, and the type of the detected event can indicate a crash or vehicular issue.

The process 200 displays second data indicative of the determined type of event (206). The second data is of a format that is consumable by a second sensor on a vehicle traversing the roadway towards the first location. The second sensor is (i) located within a first resolution distance from the display screen device and (ii) located outside a second resolution distance of detecting the event at the first location, wherein the second data is used by an on-board processing system of the vehicle. For example, the display screen device can encode the type of the detected event as a QR code—the QR code encoding data indicating a vehicular crash is ahead. The on-board sensor system on the vehicle traversing the roadway can capture the QR code and decode the QR code to decipher its meaning and take action, e.g., adjust a driving behavior of the vehicle.

Figure 3:
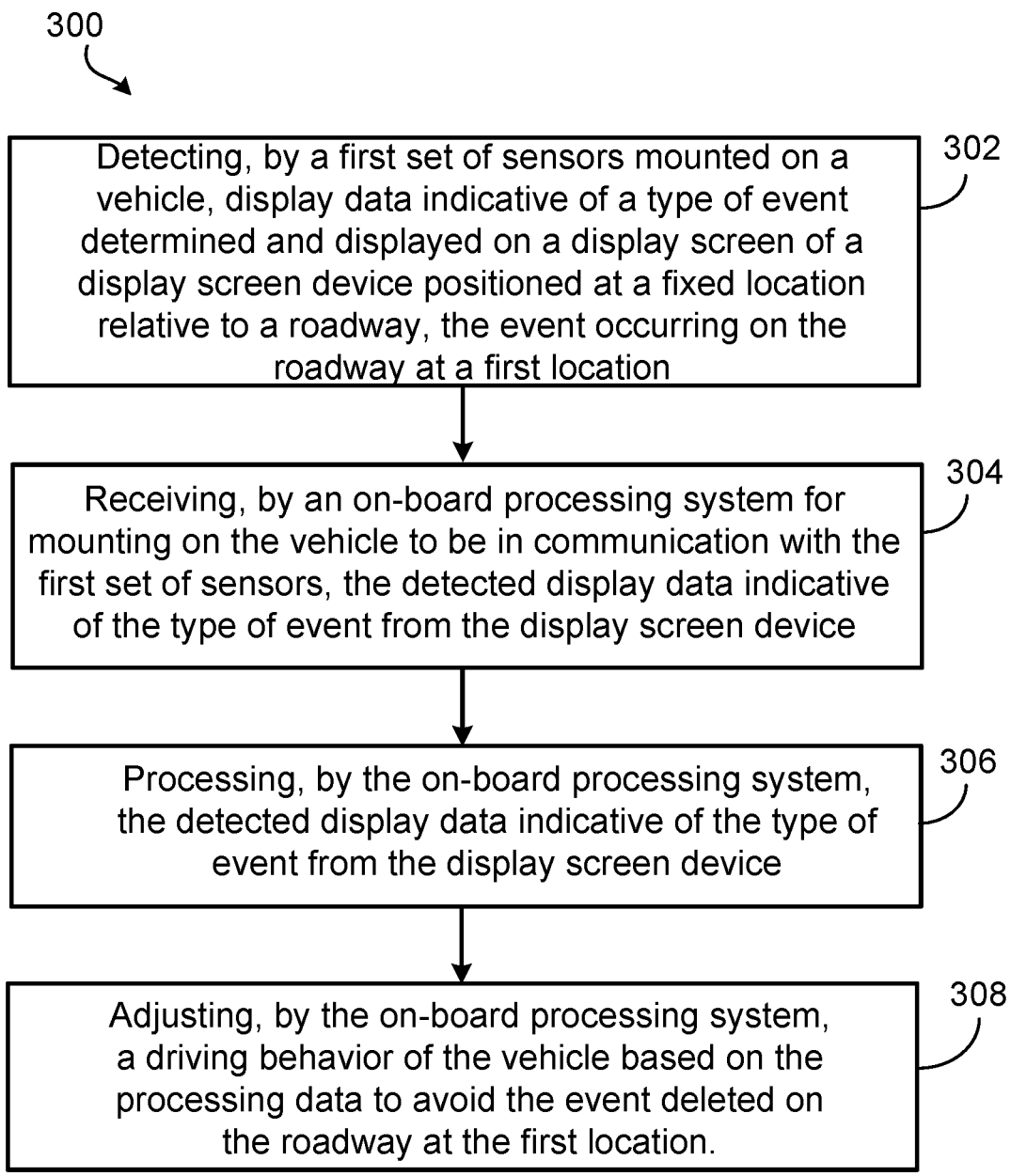
FIG. 3 is a flow diagram that illustrates an example process performed by an on-board processing system of a vehicle for adjusting a vehicle driving behavior based on data obtained from a display screen device.

FIG. 3 is a flow diagram that illustrates an example process 300 performed by an on-board processing system of a vehicle for adjusting a vehicle driving behavior based on data obtained from a display screen device.

The process 300 detects, by a first set of sensors mounted on a vehicle, display data indicative of a type of event determined and displayed on a display screen of a display screen device positioned at a fixed location relative to a roadway (302). The event is an event that occurs on the roadway at a first location. For example, a sensor of the vehicle can capture a QR code displayed by the display screen device.

The process 300 receives, by an on-board processing system for mounting on the vehicle to be in communication with the first set of sensors, the detected display data indicative of the type of event from the display screen device (304). For example, the sensor that captured the QR code can provide data of the captured QR code to an on-board sensor system of the vehicle.

The process 300 processes, by the on-board processing system, the detected display data indicative of the type of event from the display screen (306). For example, the on-board sensor system can decode the captured QR code data. The on-board sensor system can determine that the decoded captured QR code data indicates that a vehicular crash is on the road up ahead.

The process 300 adjusts, by the on-board processing system, a driving behavior of the vehicle based on the processing data to avoid the event deleted on the roadway at the first location (308). For example, in response to determining that the vehicular crash is on the road up ahead, the on-board sensor system can decide to adjust the driving behavior of the vehicle, e.g., change lanes, change driving routes, adjust a driving mode, and/or decelerate, to name a few examples.

Embodiments of the invention and all of the functional operations described in this specification may be implemented in digital electronic circuitry, or in computer software, firmware, or hardware, including the structures disclosed in this specification and their structural equivalents, or in combinations of one or more of them. Embodiments of the invention may be implemented as one or more computer program products, i.e., one or more modules of computer program instructions encoded on a computer-readable medium for execution by, or to control the operation of, data processing apparatus. The computer readable medium may be a non-transitory computer readable storage medium, a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments of the invention may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments of the invention may be implemented in a computing system that includes a back end component, e.g., as a data server, or that includes a middleware component, e.g., an application server, or that includes a front end component, e.g., a client computer having a graphical user interface or a Web browser through which a user may interact with an implementation of the invention, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system comprising:
    a display screen device positioned in a fixed location relative to a roadway and at an orientation relative to the roadway so that the display screen device is viewable from the roadway;
    a first set of sensors deployed along the roadway at fixed locations relative to the roadway, wherein:
    the first set of sensors is configured to:
        generate data describing sensor observations of a roadway at a first location; and
        provide data describing the generated sensor observations to the display screen device;
    the display screen device is configured to:
        receive, from the first set of sensors, the data describing the generated sensor observations;
        determine a detected event and a type of the detected event on the roadway from the data describing the generated sensor observations on the roadway; and
        display second data indicative of the determined type of event, the second data being of a format that is consumable by a second sensor on a vehicle traversing the roadway towards the first location, the second sensor (i) located within a first resolution distance from the display screen device and (ii) located outside a second resolution distance of detecting the event at the first location, wherein the second data is used by an on-board processing system of the vehicle to adjust a driving behavior of the vehicle.

2. The system of claim 1, wherein the display screen device is configured to:
    detect an abnormal event on the roadway at the first location using the detected generated sensor observations, the abnormal event indicative of an event for the vehicle to avoid when traversing the roadway; and
    transmit data indicative of the detected abnormal event on the roadway to (i) other sensors of the first set of sensors and (ii) a central server.

3. The system of claim 2, wherein the display screen device is configured to:
    generate the second data indicative of the determined type of the event, wherein the second data indicative of the determined type of event comprises at least one of a QR code, a textual message, a video, and one or more images.

4. The system of claim 1, further comprising:
    a plurality of display screen devices positioned in respectively fixed locations relative to the roadway and at the orientation relative to the roadway so that each of the plurality of display screen devices are viewable from the roadway, wherein each display screen device of the plurality of display screen devices is positioned at a predetermined distance apart from each other display screen devices.

5. The system of claim 1, wherein the first set of sensors comprises at least one of LIDAR, Radar, video cameras, and infrared cameras.

6. The system of claim 1, wherein the determined type of the event detected on the roadway comprises at least one of a driving hazard, a weather condition, erratic driving behavior of another vehicle, and a gas station.

7. A vehicle system comprising:
a first set of sensors for mounting on a vehicle, the first set of sensors operable to detect display data indicative of a type of event determined and displayed on a display screen of a display screen device positioned at a fixed location relative to a roadway, the event occurring on the roadway at a first location and detected by a second set of sensors deployed along the roadway at fixed locations relative to the roadway;
an on-board processing system for mounting on the vehicle to be in communication with the first set of sensors, and being operable to:
receive and process the detected display data indicative of the type of event from the display screen; and
adjust a driving behavior of the vehicle based on the processed data to avoid the event detected on the roadway at the first location.

8. The system of claim 7, wherein the on-board processing system is further configured to:
in response to processing the detected display data, modify a lane traversal control policy, wherein the lane traversal control policy indicates a portion of a lane for the vehicle to traverse on the roadway, the portion of the lane comprising (i) a center of the lane, (ii) a left side of the lane, and (iii) a right side of the lane; or
in response to processing the detected display data, modify a current speed of the vehicle.

9. The system of claim 7, wherein the on-board processing system is further configured to:
provide the detected display data to an object detection model, the object detection model is configured to (i) receive data inputs from each of the first set of sensors and (ii) generate an indication of an object, wherein the first set of sensors comprises a LIDAR system, a radar system, a video camera, and a network connectivity system.

10. The system of claim 9, wherein the on-board processing system is further configured to:
in response to processing the detected display data, adjust weights associated with the object detection model to improve subsequent detection of objects based on the determined type of event, wherein the weights preference inputs from the first set of sensors for the object detection model in generating a detection of an object.

11. The system of claim 9, wherein the on-board processing system is further configured to:
in response to processing the detected display data, adjust a driving strategy of the vehicle based on the determined type of event, wherein the driving strategy comprises a conservative mode or an aggressive mode.

12. The system of claim 9, wherein the on-board processing system is further configured to:
in response to processing the detected display data, engage a telematics system to communicate with a central server and external databases; and
transmit communications to the central server and the external databases, the communications indicating actions taken by the on-board processing system for adjusting a driving mode of the vehicle corresponding to the first set of sensors.

13. The system of claim 7, wherein the first set of sensors are further configured to:
detect a set of features as the vehicle traverses the roadway, wherein the set of features comprises environmental conditions, roadway conditions, other vehicles and does not include features indicative of the event detected at the first location.

14. The system of claim 7, wherein the first set of sensors are further configured to:
capture imagery of a QR code from the display screen;
capture textual message from the display screen and perform optical character recognition on the textual message;
capture video from the display screen; or
capture one or more images from the display screen.

15. A computer-implemented method comprising:
receiving, from a first set of sensors and at a display screen device, data describing sensor observations by the first set of sensors on a roadway at a first location, wherein the first set of sensors are deployed along the roadway at fixed locations relative to the roadway and the display screen device is (i) positioned in a fixed location relative to the roadway and (ii) at an orientation relative to the roadways so that the display screen device is viewable from the roadway;
determining, by the display screen device, a detected event and a type of the detected event on the roadway from the data describing the sensor observations on the roadway; and
displaying, by the display screen device, second data indicative of the determined type of event, the second data being of a format that is consumable by a second sensor on a vehicle traversing the roadway towards the first location, the second sensor (i) located within a first resolution distance from the display screen device and (ii) located outside a second resolution distance of detecting the event at the first location, wherein the second data is used by an on-board processing system of the vehicle.

16. The computer-implemented method of claim 15, further comprising:
generating, by the display screen device, the second data indicative of the determined type of the event, wherein the second data indicative of the determined type of event comprises at least one of a QR code, a textual message, a video, and one or more images.

17. The computer-implemented method of claim 15, wherein the first set of sensors comprises at least one of LIDAR, Radar, video cameras, and infrared cameras.

18. The computer-implemented method of claim 15, wherein the determined type of the event detected on the roadway comprises at least one of a driving hazard, a weather condition, erratic driving behavior of another vehicle, and a gas station.

19. The computer-implemented method of claim 15, further comprising:
detecting an abnormal event on the roadway at the first location using the detected sensor observations, the abnormal event indicative of an event for the vehicle to avoid when traversing the roadway; and
transmitting data indicative of the detected abnormal event on the roadway to (i) other sensors of the first set of sensors and (ii) a central server.

20. The computer-implemented method of claim 15, further comprising:
capturing, by the second sensor, imagery of a QR code from the display screen device;

capturing, by the second sensor, textual message from the display screen device and perform optical character recognition on the textual message;
capturing, by the second sensor, video from the display screen device; or
capturing, by the second sensor, one or more images from the display screen device.

\* \* \* \* \*